C. C. Pratt,
Whip,
No. 2,926. Reissued May 12, 1868.
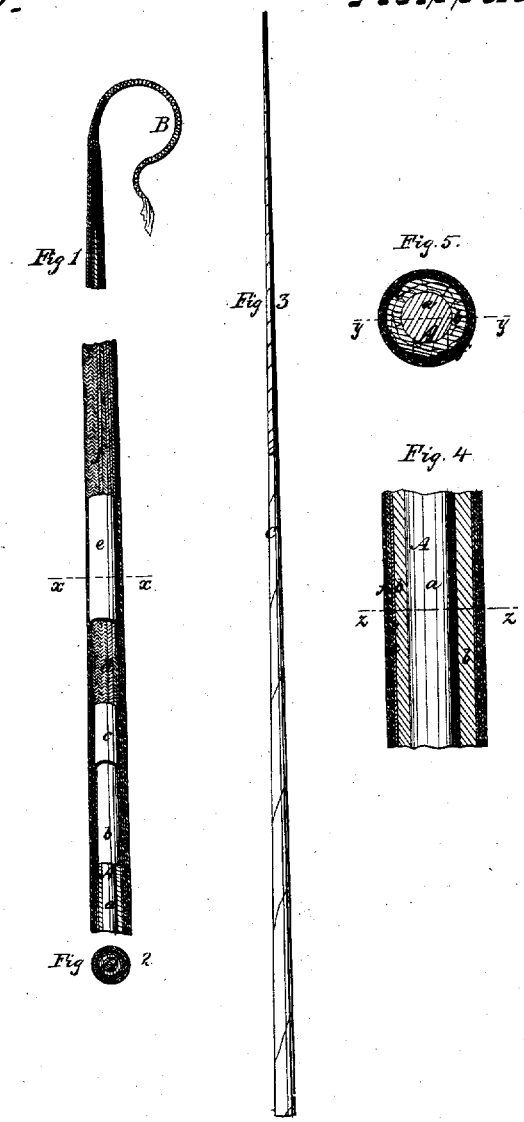
Witnesses
M. C. Aslikettler
Theo Inseke
Inventor
C. C. Pratt
per Munn & Co
Attorneys
N. PETERS, PHOTO-LITHOGRAPHER, WASHINGTON, D. C.

United States Patent Office.

CHARLES C. PRATT, OF WESTFIELD, MASSACHUSETTS, ASSIGNEE BY MESNE ASSIGNMENTS OF GAMALIEL KING.

*Letters Patent No.* 65,917, *dated June* 18, 1867; *reissue No.* 2,926, *dated May* 12, 1868.

DIVISION 2.

IMPROVEMENT IN COVERING WHIPS.

The Schedule referred to in these Letters Patent and making part of the same.

TO ALL WHOM IT MAY CONCERN:

Be it known that GAMALIEL KING, of Westfield, in the county of Hampden, and State of Massachusetts, have invented a new and useful Improvement in Whips; and I do hereby declare that the following is a full, clear, and exact description thereof, which will enable others skilled in the art to make and use the same, reference being had to the accompanying drawings, forming a part of this specification.

This invention consists in covering the body of the whip, the whalebone, cane, or other material which may be used for the same, with an inner braiding, precisely similar to that which is used for an exterior covering, whereby a more durable whip is obtained than by the ordinary mode of manufacture, which consists in simply wrapping common muslin or other fabric around the body of the whip. The inner braiding admits of a good and durable top or lash being made with the whip, and also keeps the body, which is composed of a plurality of strips, in close contact, and firmly together, and, by the addition of a varnish, water-proof or otherwise, a very tough and flexible whip is obtained.

In the accompanying sheet of drawings—

Figure 1 is a side sectional view of a portion of a whip manufactured according to this invention.

Figure 2, a horizontal section of the same, taken in the line *x x*, fig. 1.

Figure 3, a view of the inner portion of a whip of ordinary construction.

Figure 4, an enlarged longitudinal section of a portion of a whip, constructed according to this invention, taken in the line *y y*, fig. 5.

Figure 5, a horizontal section of fig. 4, taken in the line *z z*.

Similar letters of reference indicate corresponding parts.

The body, A, of the whip may be constructed of whalebone or cane, or both, which is the most common mode of manufacture, a central piece of whalebone, *a*, being encompassed by cane-strips, *b*, as shown more particularly in figs. 4 and 5. These pieces or strips, when adjusted together, are glued or coated with any suitable adhesive material, *c*, and are then covered with a braiding, *d*, which is done by a machine, and in the same way as the ordinary outer coverings for whips.

This inner braiding, *d*, is then covered with a varnish or water-proof composition, *e*, of any suitable kind, and while this varnish or composition is soft, or in a plastic state, the exterior braiding, *f*, is put on.

This inner braiding, *d*, renders the whip very tough. It keeps the several parts which comprise the body, A, firmly in contact, and, when prolonged beyond the end of the body, forms a very durable inner foundation for the outer braiding, *f*, to be worked over, the exterior of the two braidings comprising the lash B, (see fig. 1.)

In the ordinary whips, the inner muslin lining, C, (see fig. 3,) forms a very inferior extension for the lash, and, besides, it cannot be wrapped tightly around the body of the whip. The braiding, *d*, owing to the threads being drawn tightly by a machine, in the process of braiding, may be worked very tightly around the body A, rendering it exceedingly firm, and, in connection with the body and outer braided covering, forming a very cheap, durable, as well as a flexible whip.

The inner braiding is composed of cotton or other thread, and does not compare, as regards expense, with the exterior catgut braiding.

Having thus described this invention, I claim as new, and desire to secure by Letters Patent—

1. The covering of the body of a whip with an inner braiding, *d*, substantially as shown and described.

2. The combination of the inner and outer braidings, *d f*, with the varnish or coatings *c e*, all applied in the construction of a whip, substantially as shown and described.

The above specification of this invention signed by me, this 10th day of December, 1867.

CHAS. C. PRATT.

Witnesses:

WM. F. MCNAMARA,

ALEX. F. ROBERTS.